Dec. 1, 1964   W. VAN DOORN   3,159,772
MARGINAL MONITORING DEVICE
Filed March 22, 1961

INVENTOR
WILLEM VAN DOORN.
BY
AGENT

United States Patent Office 3,159,772
Patented Dec. 1, 1964

3,159,772
MARGINAL MONITORING DEVICE
Willem van Doorn, Hilversum, Netherlands, assignor to North American Philips Company, Inc., New York, N.Y., a corporation of Delaware
Filed Mar. 22, 1961, Ser. No. 97,520
Claims priority, application Netherlands Apr. 14, 1960
9 Claims. (Cl. 317—148.5)

The invention relates to a marginal monitoring device for marginally monitoring the level of a direct voltage comprising a switching voltage generator and a monitoring relay controlled by the switching voltage generator. The relay responds if the level of the direct voltage to be checked exceeds one of the two limit values of the marginal monitoring device.

In practice, such marginal monitoring devices are used in particular in carrier-wave telephony systems for monitoring the level of the pilot signal, it being required that the level of the pilot signal remains constant within two accurately fixed limit values. These limit values lie, for example, at a few db from the nominal level of the pilot signal. If the level of the pilot signal exceeds these limit values, the monitoring relay should respond which in this event actuates, for example, an alarm device or effects an automatic change-over to a spare apparatus.

The invention has for its object to provide a construction of a device of the type mentioned which is particularly suitable for transistor equipment. The device, apart from a simple structure and great flexibility, is moreover distinguished favourably by its sensitive and reliable marginal monitoring operation.

The device according to the invention is characterized in that the switching voltage generator comprises two bistable trigger arrangements with relatively different response levels. The output circuit of the first bistable trigger arrangement is connected to a feedback circuit of the second bistable trigger arrangement. The monitoring relay is included in the output circuit of the last-mentioned trigger arrangement. The direct voltage to be checked is supplied in parallel arrangement to an input circuit of each of the two bistable trigger arrangements for the energization of the switching voltage for the monitoring relay.

The invention and its advantages will now be described more fully with reference to the figures.

Figure 1:
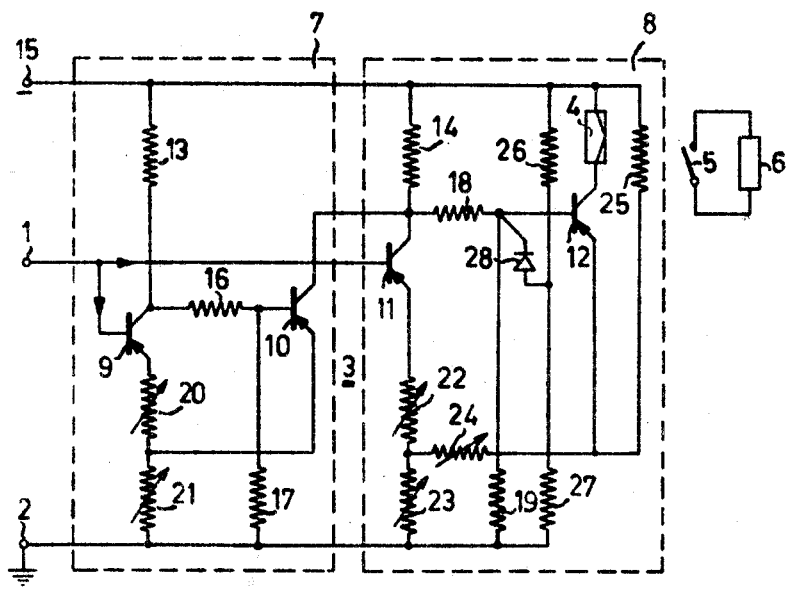
Figure 2:
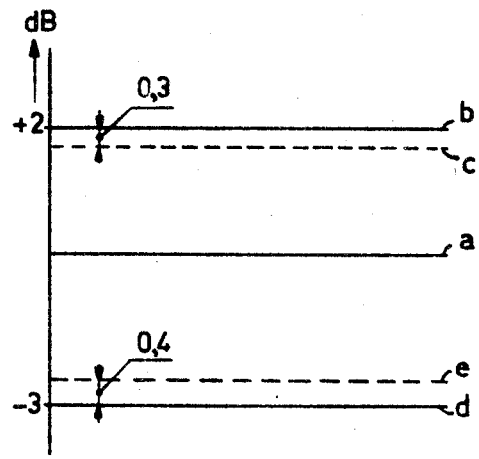

FIG. 1 is a circuit diagram of a device according to the invention with transistor equipment; and FIG. 2 is a level diagram for explaining the operation of the device shown in FIG. 1.

The marginal monitoring device shown in FIG. 1 is arranged for the marginal monitoring of the level of a pilot signal which, after being rectified in a rectifier stage not shown in the figure, is supplied with negative polarity to the input terminals 1, 2. In the embodiment shown, for example, the upper limit of the marginal monitoring device lies at +2 db and the lower limit lies at −3 db from the nominal level.

The marginal monitoring device is provided with a switching voltage generator 3 and a monitoring relay 4. The relay responds when the level of the rectified pilot signal exceeds the upper limit or the lower limit and consequently actuates an alarming device 6 shown in a block diagram in the figure through a break contact 5.

In order to obtain a sensitive and reliable operation of the marginal monitoring device, the switching voltage generator 3 comprises two bistable trigger arrangements 7, 8 having relatively different response levels. The output circuit of the first bistable trigger arrangement 7 is connected to a feedback circuit of the second bistable trigger arrangement, and the monitoring relay 4 is included in the output circuit of the last-mentioned trigger arrangement. The direct voltage occurring at the input terminals 1, 2 is supplied in parallel to the input circuit of each of the bistable trigger arrangements 7, 8 for producing the switching voltage for the monitoring relay 4.

The bistable trigger arrangements 7 and 8 comprise transistors 9, 10 and 11, 12 respectively. The input electrodes of the trigger arrangements 7, 8 are the base electrode of the transistors 9 and 11, respectively, which are connected to the input terminal 1. The collector electrodes of transistors 9 and 11, are connected through resistors 13 and 14, respectively, to the negative terminal 15 of a stabilized supply voltage source. The associated transistors 9, 10 and 11, 12, respectively, are coupled crosswise, with the collector electrodes of the transistors 9 and 11 being separately coupled to the base electrodes of the transistors 10 and 12, respectively, through voltage dividers 16, 17 and 18, 19, respectively. The emitter electrodes of these transistors 10 and 12, are connected to the junction of two series resistors 20, 21 and 22, 23, respectively, in the emitter circuit of the transistors 9 and 11, respectively.

In the bistable trigger arrangement 8, the monitoring relay 4 is included in the output circuit comprising the collector circuit of the transistor 12. In this bistable trigger arrangement 8, besides the relative coupling of the two transistors 11 and 12, respectively, the output voltage of the bistable trigger arrangement 7 has also been made effective, which voltage for this purpose is supplied to the feedback circuit going from the transistor 11 to the transistor 12 and comprising the voltage divider 18, 19.

If no input voltage is supplied to the input terminals 1, 2 of the arrangement so far described, the transistor 9 of the bistable trigger arrangement 7 will be blocked and its transistor 10 will be conductive. A relatively high negative voltage occurs at the base of the transistor 10 through the voltage divider which lies between the negative supply voltage terminal 15 and earth and which is constituted by the resistors 13, 16, 17. A voltage drop appears across resistor 21 in the emitter circuit of transistors 9 and 10 due to current flow in transistor 10. This voltage drop constitutes a blocking voltage for the transistor 9. Under this condition, the transistor 11 of the trigger arrangement 8 is also blocked, but owing to the voltage drop across resistor 14 caused by the conduction of transistor 10, the base voltage of the transistor 12 is particularly low, so that also a low collector current flows through the monitoring relay 4. This current is not sufficient to cause the relay to respond. In order to obtain sensitive and reliable marginal monitoring, under this condition it is favourable to block the transistor 12 completely. This is effected in a simple manner by connecting the emitter electrode to a voltage divider having resistors 24, 25 and connected between the negative supply voltage circuit 15 and the junction of the emitter resistors 22, 23. Consequently, if an input voltage of the terminals 1, 2 is absent, the transistors 9, 11, 12, will be blocked and the transistor 10 will be conductive, and the monitoring relay 4 is de-energized.

If, starting from this condition, the input voltage at the input terminals 1, 2 is raised in a negative sense, at the moment when this input voltage exceeds the voltage across the emitter resistor 21 of the transistor 10, the transistor 9 will draw collector current and consequently a voltage drop will occur across the resistor 13. This voltage drop is transferred to the base electrode of the transistor 10 by the voltage divider 16, 17. The resulting decrease of the emitter current in the transistor 10 causes a decrease in the reverse voltage of the transistor 9 across the emitter resistor 21, and this decrease in reverse voltage contributes to the conduction of the transistor 9. The described cumulative effect causes, as is known per se, a sudden blocking of the transistor 10 and a release of the transistor 9.

At the same time the transistor 10 is blocked, the voltage at the base electrode of the transistor 12 increases, since there flows no longer any collector current of the transistor 10 across the resistor 14. This results in the transistor 12 becoming conductive, and the monitoring relay 4 is therefore energized. In order to insure that the collector current flowing through the relay 4 is always adjusted to its most favourable value, and that influences resulting from ageing phenomena, temperature variations and the like are considerably reduced, the base of the transistor 12 in the conductive state is connected to a fixed voltage. This is achieved by means of a low-ohmic voltage divider 26, 27 connected between the negative supply voltage terminal 15 and ground. This voltage divider is connected to the base electrode of the transistor 12 by a diode 28 having a current-pass direction as indicated in the figure. The diode 28 is then conductive since the base electrode of the transistor 12 is directly connected to the voltage divider 26, 27, so that the base voltage of the transistor 12 is exclusively determined by the divisional ratio of the low-ohmic voltage divider 26, 27.

At this value of the voltage occurring at the input terminals 1, 2, the transistors 10, 11 are blocked and the transistors 9, 12 are conductive, and the monitoring relay 4 is energized.

If the voltage at the input terminals 1, 2 is further increased in a negative sense, this increase in the input voltage no longer influences the trigger arrangement 7. If this voltage exceeds the voltage occurring across the emitter resistor 23 of the transistor 11, a change-over of the trigger arrangement 8 will take place, in which case the transistor 11 becomes conductive and the transistor 12 is blocked, which results in the relay 4 becoming de-energized. Moreover, the result of the produced decrease in base voltage of the transistor 12 is that the diode 28 is blocked and hence the voltage divider 26, 27 is switched off from the base electrode of the transistor 12.

In this manner, the marginal monitoring of the input level is obtained by means of the switching voltage generator which provides that, if one of the limit values determined by the response levels of the two trigger arrangements 7, 8 is exceeded, the monitoring relay 4 is certain to respond, which, as set out above, results in an actuation of the alarm device 6 through the break contact 5. Apart from a reliable and accurate marginal monitoring operation, the arrangement described is moreover not very sensitive to the ageing phenomena, temperature variations and the like.

The marginal monitoring will now be further explained with reference to the level diagram shown in FIG. 2. In this diagram, the full line $a$ represents the nominal level of the pilot signal which lies between the limit values of the marginal monitoring device determined by the response levels of the two trigger arrangements 7, 8. At this value of the input level, as has been already explained above, the transistors 9, 12 are conductive and the transistors 10, 11 are blocked, and the monitoring relay 4 is energized.

If the voltage at the input terminals 1, 2 of the marginal monitoring device exceeds the voltage across the emitter resistor 23 of the transistor 11, which voltage is indicated in the figure by the full line $b$, the trigger arrangement 8, as already explained above, changes over, as a result of which the transistor 11 becomes conductive and the transistor 12 is blocked, and the relay 4 is de-energized. By adjusting the emitter resistor 23, the de-energizing level of the relay 4 can be adjusted at a desired value.

If the voltage at the input terminals 1, 2 is changed again in the direction of the nominal level $a$, the trigger arrangement 8 will change over to its original operating condition only at a voltage which is a few tenths of a db lower, for example 0.3 db, which voltage is indicated in the figure by the broken line $c$, in this manner; between the energizing voltage and the de-energizing voltage of the relay 4 a hysteresis is introduced which can be adjusted in a simple manner by means of the emitter resistor 22. This introduction of this hysteresis is advantageous for the practical apparatus in order to prevent an intermittent alarm, since at substantially equal values of the energizing and de-energizing voltage, inevitable small variations of the pilot signal in the proximity of these voltage values will cause an alternate energization and de-energization of the monitoring relay 4.

In a completely analogous manner, at the lower limit of the marginal monitoring device, a hysteresis of, for example, 0.4 db is introduced between the de-energizing voltage and the energizing voltage of the monitoring relay 4, which voltages may again be adjusted in a simple manner by means of the emitter resistors 20 and 21, respectively. In the figure, the de-energizing voltage is indicated by the full line $d$, the energizing voltage being indicated by the broken line $e$.

In accordance with the use, in the marginal monitoring device described, the limit values and the hysteresis may be adjusted in a simple manner. As a result the marginal monitoring device can be adapted to the monitoring requirements for the use concerned in a simple manner. The adjustment may then be brought about in different ways, for example by means of a continuous adjustment or a stepwise adjustment. If desired, both the limit values and the hysteresis may be varied at the same time, this may be achieved, for example, in a simple manner by shunting the two emitter resistors 20, 21 and 22, 23, respectively, in the emitter circuit of the transistors 9, 11 by a suitable variable resistor.

It should be noted that, when varying the resistor 23 in the emitter circuit of the transistor 12, it is advantageous to vary the resistor 24 at the same time in opposite sense, since then in adjusting the resistor 23, the total emitter resistance of the transistor 12 remains constant and thus, this is also the case with the collector current flowing through the monitoring relay 4. This may be achieved in a simple manner by utilizing for these two resistors 23, 24 a voltage divider the variable tapping point of which is connected to the resistor 22 in the emitter circuit of the transistor 11.

In conclusion, as explained in detail in the foregoing, by carrying out the steps in accordance with the invention, apart from a simple construction, a reliable marginal monitoring device is obtained which, owing to its accurate marginal monitoring operation and its great flexibility, is particularly attractive for practical uses.

The following data of a device of the type mentioned, elaborately tested in practice, are stated below.

| | |
|---|---|
| Transistors 9, 10, 11, 12 | OC 45 |
| Resistor 13 | 13KΩ |
| Resistor 20 | 0.42KΩ |
| Resistor 21 | 0.24KΩ |
| Resistor 16 | 6.2KΩ |
| Resistor 17 | 2.2KΩ |
| Resistor 14 | 3KΩ |
| Resistor 22 | 0.18KΩ |
| Resistor 23 | 0.077KΩ |
| Resistor 18 | 3.6KΩ |
| Resistor 19 | 2.7KΩ |
| Resistor 24 | 0.113KΩ |
| Resistor 25 | 3.3KΩ |
| Resistor 26 | 2KΩ |
| Resistor 27 | 0.56KΩ |
| Diode 28 | OA 85 |

Finally, it should be noted that instead of using in the marginal monitoring device the trigger arrangements of the type Schmitt shown in FIG. 1, use may also be made of other constructions of trigger arrangements. It has appeared, however, that the construction shown in FIG.

1 in technical respect is particularly attractive for practical uses.

What is claimed is:

1. A circuit responsive to the level of a direct voltage within the range between a predetermined first level and a predetermined second level of greater absolute magnitude than said first level, said circuit comprising a source of said direct voltage, first and second bistable trigger circuits, each of said trigger circuits having an input circuit, an output circuit, and having first and second stable conduction states in the respective output circuits dependent upon the voltage applied to the respective input circuit, each of said bistable trigger circuits having a feedback circuit whereby only said first and second stable conduction states can occur in the respective output circuits, said first and second trigger circuits being responsive to change conduction states at said first and second levels respectively, means applying said direct voltage to the input circuits of said first and second trigger circuits, means connecting the output circuit of said first trigger circuit to the feedback circuit of said second trigger circuit whereby a change of conduction state of said first trigger circuit produces a change in the conduction state of said second trigger circuit, and output circuit means connected to the output circuit of said second trigger circuit 2. A circuit responsive to the level of a direct voltage within the range between a predetermined first level and a predetermined second level of greater absolute magnitude than said first level, said circuit comprising a source of said direct voltage, first and second bistable trigger circuits, each of said trigger circuits comprising first and second amplifier devices, a feedback circuit connected between said first and second devices for blocking conduction of the first device when the respective second device is conducting and for blocking conduction of the second device when the respective first device is conducting, means applying said direct voltage to the first devices of said first and second trigger circuits whereby said first and second trigger circuits are responsive to voltages of said first and second levels respectively to change the state of conduction of the first and second devices of the respective trigger circuit, means connecting the second device of said first trigger circuit to the feedback circuit of said second trigger circuit whereby a change of conduction state in the first and second devices of said first trigger circuit produces a change of state of the first and second devices of said second trigger circuit, and output circuit means connected to said second device of said second trigger circuit.

3. A circuit responsive to the level of a direct voltage within the range between a predetermined first level and a predetermined second level of greater absolute magnitude than said first level, said circuit comprising a source of said direct voltage, monitor relay means having an operating coil and contact means, first and second bistable trigger circuits, each of said trigger circuits comprising first and second transistors, with the collector of the respective first transistor being coupled to the base of the respective second transistor, and the emitter of the respective second transistor being coupled to the emitter of the respective first transistor whereby current flow in one of said transistors of each of said trigger circuits will block current flow in the other of said transistors of the respective trigger circuit, means applying said direct voltage to the base electrodes of the first transistors of each of said transistor circuits whereby the conductive state of said first transistor of said first and second trigger circuits is changed at said first and second levels respectively, first and second output circuit means connected to the collectors of the second transistors of said first and second trigger circuits respectively, means connecting said first output circuit to said coupling means between the collector of the first transistor and the base of the second transistor of said second trigger circuit, whereby a change of conduction state of the second transistor of said first circuit produces a change of state of conduction of the second transistor of said second trigger circuit, means connecting said coil to said second output circuit, and utilization means connected to said contact means.

4. The circuit of claim 3, comprising a source of operating voltage having first and second terminals, wherein each of said first and second trigger circuits comprise first resistor means connected between said first terminal and the collector of said first transistor, second resistor means connected between the collector of said first transistor and the base of said second transistor, third resistor means connected between the base of said second transistor and said second terminal, fourth and fifth resistor means serially connected between the emitter of said first transistor and said second terminal, and means connecting the junction of said fourth and fifth resistor means to the emitter of said second transistor.

5. The circuit of claim 3, wherein said means connecting said first output circuit means to said coupling means comprises means connecting the collector of the second transistor of said first trigger circuit to the collector of the first transistor of said second trigger circuit.

6. The circuit of claim 4, comprising sixth resistor means connected between the emitter of the second transistor of said second trigger circuit and said second trigger circuit, and said means connecting the emitter of the second transistor of said second trigger circuit to said junction comprises seventh resistor means.

7. The circuit of claim 4, comprising resistive voltage divider means connected between said first and second terminals, said voltage divider means having a tap, and diode means connected between said tap and the base of the second transistor of said second trigger circuit, said diode means being polarized to conduct when said second transistor of said second trigger circuit is conductive.

8. A circuit responsive to the level of a direct voltage within the range between a predetermined first level and a predetermined second level of greater absolute magnitude than said first level, said circuit comprising a source of said direct voltage, first and second bistable trigger circuits each having an input circuit and an output circuit, means applying said direct voltage to both of said input circuits, said first trigger circuit having a first conduction stable state in its output circuit when said direct voltage is below said first level and a second stable conduction state in its output circuit when said direct voltage is above said first level, said second trigger circuit having a third stable conduction state in its output circuit when said direct voltage is below said second level and a fourth stable conduction state in its output circuit when said direct voltage is above said second level, said first and second bistable trigger circuits each having a positive feedback circuit whereby the conduction states in said output circuits must be said stable states, means connecting the output circuit of said first trigger circuit to the feedback circuit of said second trigger circuit for holding said second trigger circuit in said fourth stable state when said first trigger circuit is in said first stable state, whereby said second trigger circuit is in said third stable state only when said direct voltage is below said first level and above said second level, and output circuit means connected to the output circuit of said second trigger circuit.

9. A circuit responsive to the level of a direct voltage within the range between a predetermined first level and a predetermined second level of greater absolute magnitude than said first level, said circuit comprising a source of said direct voltage, first and second bistable circuits each having first and second amplifying devices and an input circuit and an output circuit, said first and second amplifiers being interconnected in each of said bistable circuits whereby a first conduction state of the second amplifier device holds the respective first amplifier device in a second conduction state unless the voltage in the respective input circuit exceeds a threshold level, the threshold levels of said first and second bistable circuits being said first and second levels respectively, the output circuit of said first bistable circuit being connected to said second bistable circuit to hold the second amplifying device of said second bistable circuit in said second conduction state until said direct voltage exceeds said first level, and output circuit means connected to the output circuit of said second bistable circuit.

References Cited in the file of this patent
UNITED STATES PATENTS

| | | |
|---|---|---|
| 2,945,174 | Hetzler | July 12, 1960 |
| 2,965,889 | Cook et al. | Dec. 20, 1960 |
| 3,009,110 | Cole et al. | Nov. 14, 1961 |
| 3,041,469 | Ross | June 26, 1962 |